United States Patent
Nagata et al.

[15] 3,683,091
[45] Aug. 8, 1972

[54] CERTAIN PHENANTHRENE COMPOUNDS FOR TREATMENT OF ACNE

[72] Inventors: Wataru Nagata, 7-go, 6-ban, Kawahigashi-cho, Nishinomiya-shi; Tadao Terasawa, 765, Tonda-cho, Takatsuki-shi; Tsutomu Sugasawa, 1327, Uozaki-cho, Higashinada-ku, Kobe-shi, Japan

[22] Filed: Nov. 13, 1967

[21] Appl. No.: 682,507

[52] U.S. Cl. ............................ 424/331, 260/586 H
[51] Int. Cl. ......................................... A61k 27/00
[58] Field of Search .................. 424/331; 260/326.5

[56] References Cited

UNITED STATES PATENTS 3,471,565  10/1969  Nagata et al. ............... 424/331

OTHER PUBLICATIONS

Harrow, Biochemistry, 5th Ed., W. B. Saunders Co., 1951, pages 522 and 523
Chemical Abstracts 56: P 2,399(f), 1962

*Primary Examiner*—Jerome D. Goldberg
*Assistant Examiner*—Vincent D. Turner
*Attorney*—Wenderoth, Lind & Ponack

[57] ABSTRACT

Phenanthrene compounds, specifically di-7-hydroxy or methyl-2,3,4,4a,9,10-hexahydrophenanthren-2-one and 4a-alkyl derivatives, hydrogenated derivatives, functional derivatives and optically active isomers thereof are useful as specific anti-acne agents.

14 Claims, No Drawings

CERTAIN PHENANTHRENE COMPOUNDS FOR TREATMENT OF ACNE

The present invention relates to compositions which comprise one or more of the compounds represented by the following Formula I or one or more salts thereof with a base:

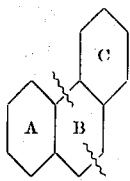

(I)

wherein the left-half part of formula I (including the A-ring and a half part of the B-ring) represents one of the following partial formulae II–IV:

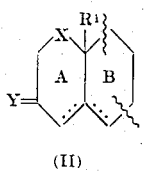 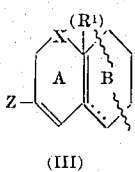 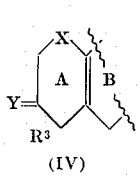

(II)    (III)    (IV)

and the right-half part of the Formula I (including the remainder of the B-ring and C-ring) represents one of the following partial formulae V–VII:

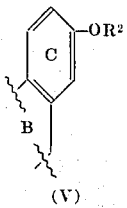 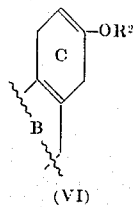 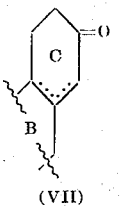

(V)    (VI)    (VII)

in which $R^1$ represents a hydrogen atom or a hydrocarbon radical having one to four carbon atoms, $R^2$ represents a hydrogen atom or the methyl group, $R^3$ represents a hydrogen atom or a hydrocarbon radical having one to four carbon atoms, X represents presence or absence of a methylene group ($-CH_2-$), Y represents

(wherein $R^4$ represents a hydrogen atom or an acyl group), an oxygen atom, a nitrogen-containing functionally derived group from ketone, a ketal group or the

group (wherein $R^5$ represents a hydrocarbon radical having one to four carbon atoms), Z represents a tertiary amino group, an acyloxy group or an alkyloxy group having one to four carbon atoms, the dotted line represents the presence or absence of a double bond, and the parentheses attached to $R^1$ indicates absence of $R^1$ when a double bond is present at the carbon atom (4a) at the root of $R^1$. By "a radical having one to four carbon atoms" is meant a saturated or unsaturated straight chain or branched chain aliphatic hydrocarbon radical such as methyl, ethyl, propyl, butyl, isopropyl, allyl, vinyl, ethynyl or the like, the acyl group means an aliphatic carboxylic acyl group such as formyl, acetyl, propionyl, butyryl, valeryl, hexanoyl, heptanoyl, octanoyl, nonanoyl, oxalyl, succinoyl or the like or an aromatic carboxylic acyl group such as benzoyl, phenylacetyl, p-nitrobenzoyl, o-carboxybenzoyl or the like; by "the nitrogen-containing functionally derived group from ketone" is meant a bivalent radical corresponding to a so-called functional derivative such as oxime, semicarbazone, hydrazone or the like, or the alkyl-, phenyl- or acyl-substituted derivative thereof, more specifically hydroxyimino, alkoxyimino, semicarbazono, thiosemicarbazono, hydrazono, phenylhydrazono, acetylhydrazono, benzoylhydrazono, isonicotinoylhydrazono or the like. By "a ketal group" is meant a lower dialkyl ketal such as dimethyl ketal, diethyl ketal, dipropyl ketal or the like or a lower alkylene ketal such as ethylene ketal, propylene ketal or the like. By "a tertiary amino group" is meant a lower dialkylamino group such as the dimethylamino group, diethylamino group, dipropylamino group or the like or a lower alkyleneamino group such as the pyrrolidino group, piperidino group or the like.

In so far as these compounds have salt forming radicals (e.g., carboxyl group, tertiary amino group, etc.), they can equally as well be used in the corresponding salt form.

Among these salts, sodium salts, ammonium salts, hydrochlorides, quaternary salts may be used more advantageously in the light of their good solubility in water.

Typical examples of the active ingredient are exemplified as follows:

7-Methoxy-2,3,4,4aβ,9,10-hexahydrophenanthren-2-one,
4a-Methyl-7-hydroxy-2,3,4,4aβ,9,10-hexahydrophenanthren-2-one,
4a-Methyl-7-methoxy-2,3,4,4aβ,9,10-hexahydrophenanthren-2-one,
4a-Ethyl-7-hydroxy-2,3,4,4aβ,9,10-hexahydrophenanthren-2-one,
4a-Ethyl-7-methoxy-2,3,4,4aβ,9,10-hexahydrophenanthren-2-one,
4a-Ethyl-7-methoxy-1,2,3,4,4aβ,9-hexahydrophenanthren-2-one,
4a-Vinyl-7-methoxy-2,3,4,4aβ,9,10-hexahydrophenanthren-2-one,
4a-Ethynyl-7-methoxy-2,3,4,4aβ,9,10-hexahydrophenanthren-2-one,
4a-Propyl-7-hydroxy-2,3,4,4aβ,9,10-hexahydrophenanthren-2-one,
4a-Propyl-7-methoxy-2,3,4,4aβ,9,10-hexahydrophenanthren-2-one,
4a-Allyl-7-hydroxy-2,3,4,4aβ,9,10-hexahydrophenanthren-2-one,
4a-Allyl-7-methoxy-2,3,4,4aβ,9,10-hexahydrophenanthren-2-one,
4a-Isopropyl-7-hydroxy-2,3,4,4aβ,9,10-hexahydrophenanthren-2-one,
4a-Isopropyl-7-methoxy-2,3,4,4aβ,9,10-hexahydrophenanthren-2-one,
4a-Butyl-7-hydroxy-2,3,4,4aβ,9,10-hexahydrophenanthren-2-one,
4a-Butyl-7-methoxy-2,3,4,4aβ,9,10-hexahydrophenanthren-2-one, 4a-s-Butyl-7-hydroxy-2,3,4,4aβ,9,10-hexahydrophenanthren-2-one,
4a-s-Butyl-7-methoxy-2,3,4,4aβ,9,10-hexahydrophenanthren-2-one,
4a-t-Butyl-7-hydroxy-2,3,4,4aβ,9,10-hexahydrophenanthren-2-one,
4a-t-Butyl-7-methoxy-2,3,4,4aβ,9,10-hexahydrophenanthren-2-one,
7-Methoxy-2,3,4,4aβ,9,10-hexahydrophenanthren-2-one semicarbazone,
4a-Methyl-7-methoxy-2,3,4,4aβ,9,10-hexahydrophenanthren-2-one oxime,
4a-Ethyl-7-hydroxy-2,3,4,4aβ,9,10-hexahydrophenanthren-2-one semicarbazone,
4a-Ethyl-7-methoxy-2,3,4,4aβ,9,10-hexahydrophenanthren-2-one oxime,
4a-Ethyl-7-methoxy-2-methoxyimino-2,3,4,4aβ,9,10-hexahydrophenanthrene,
4a-Ethyl-7-methoxy-2,3,4,4aβ,9,10-hexahydrophenanthren-2-one semicarbazone,
4a-Ethyl-7-methoxy-2,3,4,4aβ,9,10-hexahydrophenanthren-2-one hydrazone,
4a-Ethyl-7-methoxy-2,3,4,4aβ,9,10-hexahydrophenanthren-2-one phenylhydrazone,
4a-Ethyl-7-methoxy-2,3,4,4aβ,9,10-hexahydrophenanthren-2-one acetylhydrazone,
4a-Ethyl-7-methoxy-2,3,4,4aβ,9,10-hexahydrophenanthren-2-one benzoylhydrazone,
4a-Propyl-7-methoxy-2,3,4,4aβ,9,10-hexahydrophenanthren-2-one semicarbazone,
4a-Allyl-7-methoxy-2,3,4,4aβ,9,10-hexahydrophenanthren-2-one semicarbazone,
4a-Butyl-7-methoxy-2,3,4,4aβ,9,10-hexahydrophenanthren-2-one semicarbazone,
2,2-Ethylenedioxy-4a-methyl-7-methoxy-1,2,3,4,4aβ,-hexahydrophenanthrene,
2,2-Dimethoxy-4a-ethyl-7-methoxy-1,2,3,4,4aβ,9-hexahydrophenanthrene,
2,2-Ethylenedioxy-4a-ethyl-7-methoxy-1,2,3,4,4aβ,9-hexahydrophenanthrene,
2-Pyrrolidino-7-methoxy-3,4,9,10-tetrahydrophenanthrene,
2-Pyrrolidino-4a-methyl-7-methoxy-3,4,4a,9-tetrahydrophenanthrene and its camphor-10-sulfonate,
2-Pyrrolidino-4a-ethyl-7-methoxy-3,4,4aβ,9-tetrahydrophenanthrene,
2-Dimethylamino-4a-ethyl-7-methoxy-3,4,4aβ,9-tetrahydrophenanthrene,
2-Ethoxy-4a-ethyl-7-methoxy-3,4,4aβ,9-tetrahydrophenanthrene,
2-Acetyloxy-4a-methyl-7-methoxy-3,4,4aβ,9-tetrahydrophenanthrene,
2-Acetoxy-4a-ethyl-7-methoxy-3,4,4aβ,9-tetrahydrophenanthrene,
7-Methoxy-2,3,4,4aβ,9,10-hexahydrophenanthren-2β-ol,
4a-Methyl-7-methoxy-2,3,4,4aβ,9,10-hexahydrophenanthren-2β-ol,
4a-Methyl-7-methoxy-1,2,3,4,4aβ,9-hexahydrophenanthren-2β-ol,
4a-Ethyl-2,3,4,4aβ,9,10-hexahydrophenanthrene-2β,7-diol,
4a-Ethyl-7-methoxy-2,3,4,4aβ,9,10-hexahydrophenanthren-2β-ol,
4a-Ethyl-7-methoxy-1,2,3,4,4aβ,9-hexahydrophenanthren-2β-ol,
2-Acetyloxy-4a-ethyl-7-methoxy-2,3,4,4aβ,9,10-hexahydrophenanthrene,
4a-Ethyl-7-methoxy-2,3,4,4aβ,9,10-hexahydrophenanthren-2β-ol o-phthalate and its (mono)-sodium salt,
4a-Ethyl-7-methoxy-2,3,4,4aβ,9,10-hexahydrophenanthren-2β-ol p-nitrobenzoate,
4a-Vinyl-7-methoxy-2,3,4,4aβ,9,10-hexahydrophenanthren-2β-ol,
4a-Ethynyl-7-methoxy-2,3,4,4aβ,9,10-hexahydrophenanthren-2β-ol,
4a-s-Butyl-7-methoxy-2,3,4,4aβ,9,10-hexahydrophenanthren-2β-ol,
7-methoxy-1,2,3,4,4aβ,9,10,10aα-octahydrophenanthren-2-one,
4a-Methyl-7-methoxy-1,2,3,4,4aβ,9,10,10aα-octahydrophenanthren-2-one,
4a-Ethyl-7-methoxy-1,2,3,4,4aβ,9,10,10aα-octahydrophenanthren-2-one and its ethylene ketal,
4a-i-Propyl-7-hydroxy-1,2,3,4,4aβ,9,10,10aα-octahydrophenanthren-2-one,
4a-i-Propyl-7-methoxy-1,2,3,4,4aβ,9,10,10aα-octahydrophenanthren-2-one,
4a-Butyl-7-methoxy-1,2,3,4,4aβ,9,10,10aα-octahydrophenanthren-2-one,
4a-Ethyl-7-hydroxy-1,2,3,4,4aβ,9,10,10aα-octahydrophenanthren-2-one oxime,
4a-Ethyl-7-methoxy-1,2,3,4,4aβ,9,10,10aα-octahydrophenanthren-2-one oxime,
4a-Ethyl-7-methoxy-1,2,3,4,4aβ,9,10,10aα-octahydrophenanthren-2-one semicarbazone,
4a-Ethyl-7-methoxy-1,2,3,4,4aβ,9,10,10aα-octahydrophenanthren-2-one isonicotinoylhydrazone,
4a-Propyl-7-methoxy-1,2,3,4,4aβ,9,10,10aα-octahydrophenanthren-2-one isonicotinoylhydrazone,
4a-Butyl-7-methoxy-1,2,3,4,4aβ,9,10,10aα-octahydrophenanthren-2-one isonicotinoylhydrazone,
2,4,a-Dimethyl-7-methoxy-1,2,3,4,4aβ,9,10,10aα-octahydrophenanthren-2-ol,
2-Ethynyl-4a-methyl-7-methoxy-1,2,3,4,4aβ,9,10,10aα-octahydrophenanthren-2-ol,
2-Methyl-4a-ethyl-7-methoxy-1,2,3,4,4aβ,9,10,10aα-octahydrophenanthren-2-ol,
2,4a-Diethyl-7-methoxy-1,2,3,4,4aβ,9,10,10aα-octahydrophenanthren-2-ol,
2-Ethynyl-4a-ethyl-7-methoxy-1,2,3,4,4aβ,9,10,10aα-octahydrophenanthren-2-ol,
2-Butyl-4a-ethyl-7-methoxy-1,2,3,4,4aβ,9,10,10aα-octahydrophenanthren-2-ol,
2-Ethynyl-4a-i-propyl-7-methoxy-1,2,3,4,4aβ,9,10,10aα-octahydrophenanthren-2-ol,
7-Methoxy-1,2,3,4,4aβ,9,10,10aα-octahydrophenanthren-2β-ol,
4a-Methyl-7-methoxy-1,2,3,4,4aβ,9,10,10aα-octahydrophenanthren-2β-ol,
4a-Ethyl-7-methoxy-1,2,3,4,4aβ,9,10,10aα-octahydrophenanthren-2β-ol,
2β-Acetyloxy-4a-ethyl-7-methoxy-1,2,3,4,4aβ,9,10,10aα-octahydrophenanthrene,
4a-Ethyl-7-methoxy-1,2,3,4,4aβ,9,10,10aα-octahydrophenanthren-2β-ol propionate, 4a-i-Propyl-1,2,3,4,4aβ,9,10,10aα-octahydrophenanthrene-2β,7-diol,
4a-i-Propyl-7-methoxy-1,2,3,4,4aβ,9,10,10aα-octahydrophenanthren-2β-ol,
4a-Butyl-7-methoxy-1,2,3,4,4aβ,9,10,10aα-octahydrophenanthren-2β-ol and its benzoate,
7-Methoxy-1,2,3,4,9,10-hexahydrophenanthren-2-one and its ethylene ketal,
7-Methoxy-1,2,3,4,9,10-hexahydrophenanthren-2β-ol,
1-Methyl-7-methoxy-1,2,3,4,9,10-hexahydrophenanthren-2β-ol,
1-Allyl-7-hydroxy-1,2,3,4,9,10-hexahydrophenanthren-2-one,
1-Allyl-7-methoxy-1,2,3,4,9,10-hexahydrophenanthren-2-one,
7-Methoxy-1,2,3,4,4aβ,5,8,9,10,10aα-decahydrophenanthren-2β-ol,
4a-Methyl-7-methoxy-1,2,3,4,4aβ,5,8,9,10,10aα-decahydrophenanthren-2β-ol,
4a-Ethyl-7-methoxy-1,2,3,4,4aβ,5,8,9,10,10aα-decahydrophenanthren-2β-ol,
4a-Ethyl-7-methoxy-2,3,4,4aβ,5,8,9,10-octahydrophenanthren-2-one and its ethylene ketal,
4a-Ethyl-7-methoxy-1,2,3,4,4aβ,5,8,9,10,10aα-decahydrophenanthren-2-one,
4a-Butyl-7-methoxy-1,2,3,4,4aβ,5,8,9,10,10aα-decahydrophenanthren-2β-ol,
7-Oxo-1,2,3,4,4aβ,4bα,5,6,7,9,10,10aα-dodecahydrophenanthren-2β-ol,
1,2,3,4,4aβ,4bα,5,6,7,9,10,10aα-Dodecahydrophenanthrene-2,7-dione,
4a-Methyl-7-oxo-1,2,3,4,4aβ,4bα,5,6,7,9,10,10aα-dodecahydrophenanthren-2β-ol and its acetate,
4a-Methyl-1,2,3,4,4aβ,5,6,7,8,9-decahydrophenanthrene-2,7-dione 2,3-dihexyl ketal,
4a-Methyl-1,2,3,4,4aβ,5,6,7,8,9-decahydrophenanthrene-2,7-dione 2,2-ethylene ketal,
4a-Methyl-1,2,3,4,4aβ,5,6,7,8,9-decahydrophenanthrene-2,7-dione 2,2-trimethylene ketal,
4a-Ethyl-1,2,3,4,4aβ,5,6,7,8,9-decahydrophenanthrene-2,7-dione 2,2-dimethyl ketal and 2,2-dipropyl ketal,
2,2-Ethylenedioxy-4a-ethyl-1,2,3,4,4aβ,5,6,7,8,9-decahydrophenanthren-7-one,
2,2-Ethylenedioxy-4a-propyl-1,2,3,4,4aβ,5,6,7,8,9-decahydrophenanthren-7-one,
2,2-Trimethylenedioxy-4a-isopropyl-1,2,3,4,4aβ,5,6,7,8,9-decahydrophenanthren-7-one,
2,2-Diethoxy-4a-butyl-1,2,3,4,4aβ,5,6,7,8,9-decahydrophenanthren-7-one,
2,2-Dimethoxy-4a-s-butyl-1,2,3,4,4aβ,5,6,7,8,9-decahydrophenanthren-7-one,
4a-Ethyl-7-oxo-1,2,3,4,4aβ,4bα,5,6,7,9,10,10aα-dodecahydrophenanthren-2β-ol,
4a-Propyl-7-oxo-1,2,3,4,4aβ,4bα,8,6,7,9,10,10aα-dodecahydrophenanthren-2β-ol benzoate,
4a-Butyl-7-oxo-1,2,3,4,4aβ,4bα,5,6,7,9,10,10aβ-dodecahydrophenanthren-2β-ol benzoate,
7-Methoxy-9b-ethyl-2,4,5,9bβ-tetrahydro-1H-benz[e]inden-2-one,
7-Methoxy-9b-i-propyl-2,4,5,9bβ-tetrahydro-1H-benz[e]inden-2-one,
7-Methoxy-9b-butyl-2,4,5,9bβ-tetrahydro-1H-benz[e]inden-2-one and the like.

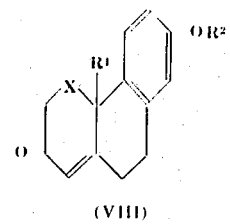

(VIII)

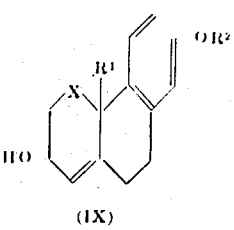

(IX)

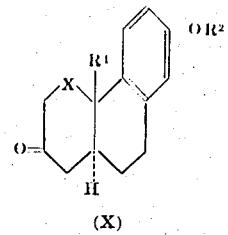

(X)

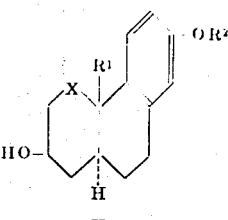

(XI)

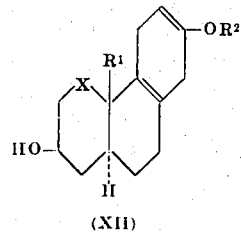

(XII)

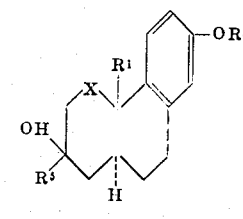

(XIII)

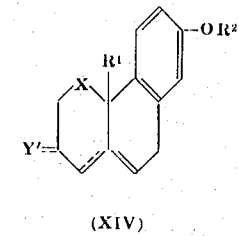

(XIV)

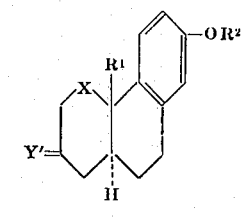

(XV)

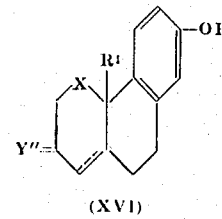

(XVI)

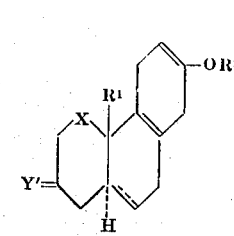

(XVIII)

(XVII)

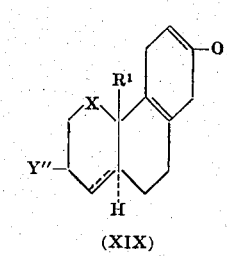

(XIX)

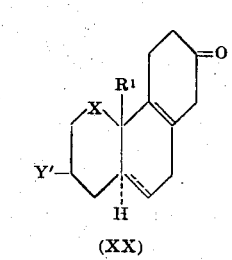

(XX)

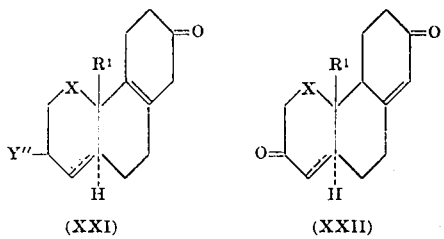
(XXI)   (XXII)

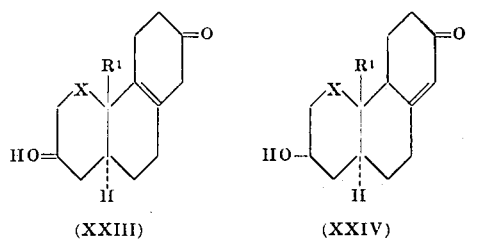
(XXIII)   (XXIV)

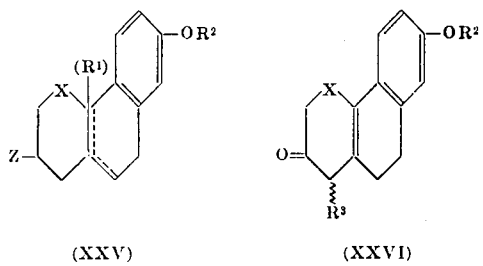
(XXV)   (XXVI)

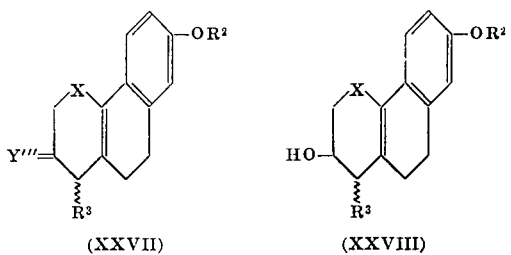
(XXVII)   (XXVIII)

Among these compounds, those of Formula VIII (symbols in the formula represent respectively the same meanings defined above unless otherwise noted: The same shall be applied hereinafter) are known or novel substances which are prepared according to a per se known process or by a process which comprises reacting a compound of the formula:

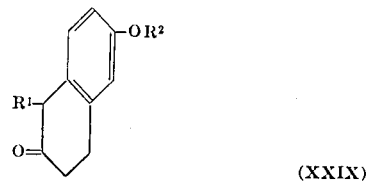
(XXIX)

with a propargyl halide of the formula:

$$CH \equiv C \cdot CH_2 \cdot X'$$

(wherein X' represents a halogen atom) to yield a compound of the formula:

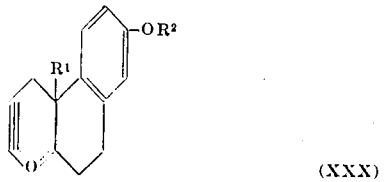
(XXX)

subjecting the latter compound to hydration to yield a compound of the formula

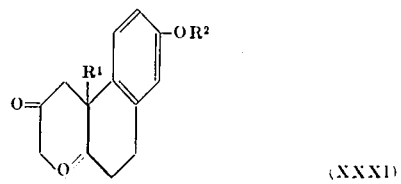
(XXXI)

and subjecting the latter compound to intramolecular condensation to yield a compound of the formula:

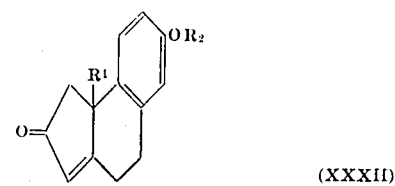
(XXXII)

(In all these formulae, $R^1$ and $R^2$ are as precedingly defined.)

The first step of the reaction is carried out by reacting a starting compound (XXIX) with a propargyl halide in the presence of a basic catalyst to yield 1-propargyl tetralone derivative (XXX). X' in the propargyl halide is Cl, Br or I, and the basic catalysts are exemplified by a metal alkoxide such as sodium methoxide, potassium methoxide, sodium ethoxide, potassium ethoxide, potassium t-butoxide, sodium t-amyloxide and the like, sodium amide, potassium amide, lithium diethylamide, sodium hydride, lithium hydride, the lithium or sodium or potassium derivatives of triphenyl methane and the sodium derivative of naphthalene. The reaction can be carried out according to the per se conventional method of alkylation of an active methylene compound, for instance, in a solvent, appropriate to the aforesaid base catalyst, selected from the group consisting of t-butanol, t-amyl alcohol, ethanol, methanol, benzene, toluene, xylene, ether, 1,2-dimethoxyethane, liquid ammonia and dimethyl sulfoxide, at such a temperature, reaction time and under such conditions as are suitable for the halogen atom of the propargyl halide, the catalyst and the solvent used in this process.

The second step of the reaction, i.e., hydration of the acetylenic bond of the propargyl group in the compound XXX, is carried out according to a per se conventional hydration method of acetylenic bonds, for instance, by the hydration method in the presence of sulfuric acid and silver sulfate or in the presence of a sulfonate polystyrene ion exchange resin (Hg–Dowex–50) impregnated with mercuric sulfate.

In the third step, the hydration product prepared in the second step, i.e., the l-acetonyl tetralone derivative (XXXI), is converted into a benzindene derivative (XXXII) by intramolecular acid- or base-catalyzed condensation. The reaction can be carried out according to the per se conventional procedure for the reaction of a carbonyl group with an active methylene group, for instance, in the presence of a catalyst such as an inorganic acid, e.g., sulfuric acid or hydrochloric acid, an alkali, e.g., sodium hydroxide or potassium hydroxide, or sodium methoxide, potassium ethoxide, potassium t-butoxide, sodium t-amyloxide, sodium amide, potassium amide, sodium hydride, diethylamine, triethylamine, or piperidine, under appropriate conditions with respect to solvent, temperature, reaction time and the like.

Among the compounds of general formula VIII, compounds having a hydrogen atom as $R^2$ are prepared alternatively by the method which comprises hydrolyzing the corresponding compound VIII having a methyl group as $R^2$. The reaction can be carried out according to per se conventional methods for an ether cleavage reaction having no effect on the other functional groups, e.g., the method of heating in hydriodic acid-acetic acid, hydrobromic acid-acetic acid or hydrochloric acid-acetic acid mixture, or heating with pyridine hydrochloride, the cleavage method by means of Lewis acid, e.g., reaction in carbon disulfide or nitrobenzene with anhydrous aluminum chloride or reaction with a boron halide such as boron tribromide, or the cleavage reaction with a Grignard reagent (in which case the oxo group must be protected with a ketal group, and so forth).

Compounds of the general formula IX are known or novel substances which are prepared by reduction of the corresponding compounds VIII with an alkali metal complex hydride or the like in per se conventional manner. Compounds of the general formula X are known or novel substances which are prepared by the method which comprises reducing a compound VIII by the so-called Birch reduction method using an alkali metal such as lithium, sodium or potassium in liquid ammonia or by per se conventional hydrogenation using palladium or nickel catalyst. Compounds of the general formula XI are known or novel substances which are prepared from the corresponding compounds X by a per se conventional reduction process using an alkali metal complex hydride such as lithium aluminum hydride, sodium borohydride, lithium borohydride, potassium borohydride or the like, a mixture of sodium and an alcohol, or an amalgam such as sodium amalgam, zinc amalgam, or by catalytic hydrogenation with nickel catalyst, palladium catalyst or platinum catalyst or from the corresponding compounds VIII, IX or X by the Birch reduction method in per se conventional manner.

Compounds of the general formula XII are known or novel substances which are prepared from the corresponding compounds VIII, IX, X or XI by Birch reduction in the per se conventional manner in the presence of an alcohol such as methanol, ethanol or the like as proton source at low temperature under stirring and, if necessary, in the presence of a co-solvent such as ether, tetrahydrofuran, dioxane or the like.

Compounds of the general formula XIII are known or novel substances which are prepared by the reaction of the corresponding compounds X and the corresponding metalated hydrocarbons. The reaction may be carried out with the ketone compound X and a corresponding metalated hydrocarbon such as a Grignard reagent, e.g., ethylmagnesium iodide, propylmagnesium bromide, ethynylsodium, ethynylpotassium, or methyllithium, butyllithium or the like in an inert solvent. In this case, when the ethynyl group is to be introduced, acetylene can be used in the presence of appropriate strongly basic catalyst such as sodium alkoxide or potassium alkoxide, sodium amide in an alcohol, or sodium or potassium in liquid ammonia.

Compounds of the general formula XIV, XV and XVI, wherein Y' represents a ketal group and Y" represents a nitrogen-containing functionally derived group from ketone (Y' and Y" having this same significance throughout this specification); are known or novel substances which are prepared from the corresponding ketonic substances (VIII or X) by the per se conventional ketalization method or the per se conventional process for producing functional derivatives from ketone compounds. Thus, the ketalization may be carried out with the corresponding alkanol (e.g., methanol, ethanol, propanol or the like) or alkanediol (e.g., ethylene glycol, propylene glycol or the like) at a temperature from room temperature (about 15° C. to about 30° C.) to a temperature under heating in the presence of catalyst such as p-toluenesulfonic acid, trifluoroboron, selenium dioxide, perchloric acid, hydrogen chloride or the like. The nitrogen-containing functional group such as oxime, semicarbazone, hydrazone or the like, or the alkyl-, phenyl- or acyl-substituted derivatives thereof can be prepared by the action of a so-called ketone reagent in the presence of catalyst such as acetic acid, hydrochloric acid, p-toluenesulfonic acid, sulfuric acid, sodium acetate, or the like at room temperature or elevated temperature in an inert solvent.

Compounds of the general formula XVII are known or novel substances which are prepared from the corresponding compounds XIV by mild hydrolysis using acid; compounds of the general Formula XVIII and XIX are known or novel substances which are respectively prepared from the corresponding benzene compounds (XIV, XV or XVI) by the Birch reduction method in the per se conventional manner; compounds of the general Formulas XX, XXI, XXII, XXIII and XIV are known or novel substances which are prepared from the corresponding dihydrobenzene compounds (XVIII, XIX or XII) by mild or vigorous treatment with acid (hydrolysis) directly or successively. Enamine or enol compounds of the general formula XXV are known or novel substances which are prepared from the corresponding ketonic substances XIII by per se conventional enamine-formation, enol-etherification or enol-acylation process. Enamine-formation can be carried out with the corresponding secondary amine such as dimethylamine, diethylamine, dipropylamine, pyrrolidine, piperidine or the like in an inert solvent such as benzene, tetrahydrofuran, dioxane, methanol, ethanol or the like at a temperature from about room temperature to the boiling point of the solvent used. Azeotropy can be effectively applied. Enol-etherification can be carried out with acetone dimethyl ketal, ethyl orthoacetate or the like in the presence of catalyst such as p-toluenesulfonic acid, sulfuric acid or the like in an inert solvent such as dimethylformamide, alcohol, benzene or the like. Alternatively, the enol-ether can be prepared by pyrolysis of the corresponding ketal (XIV or XV). Enol-acylation can be carried out with an acylating agent such as acetic anhydride or isopropenyl acetate in the presence of catalyst such as p-toluenesulfonic acid, sulfuric acid or the like with heating.

Compounds of the general formula XXVI are novel substances which are prepared by alkylating the corresponding enamine compounds XXV (wherein R¹ is absent owing to the presence of a double bond) in the manner which comprises refluxing an enamine (XXV) with an alkyl to be introduced, in an anhydrous solvent such as acetonitrile, ether, tetrahydrofuran, dioxane, methanol, ethanol, benzene, toluene or the like for several hours, preferably under an inert gas such as nitrogen, followed by per se conventional hydrolysis using acid. Alternatively they can be prepared by pyrolytic rearrangement of the corresponding compounds VIII having an allyl group as R¹, at about 100°–300° C.

Compounds of the general formula XXVII (Y''' represents Y' or Y'') are novel substances which are prepared from the corresponding compound XXVI by the per se conventional ketalization method or reaction with conventional ketone reagents. Compounds of the general formula XXVIII are novel substances which are prepared respectively from the corresponding compounds XXVI by reduction with alkali metal complex hydride in the per se conventional manner. The acylates of the 2β-alcohol compounds of the general formula IX, XI, XII, XXIV, XXVIII or the like are known or novel substances which are prepared by per se conventional acylation procedure.

Among these compounds, the enamine compounds can be converted into the corresponding acid addition salts or quaternary compounds in per se conventional manner and the acylates with the polybasic acid can be converted into the corresponding salts by substituting the free carboxyl group with metal ion or ammonium ion in per se conventional manner.

These compounds are active in the racemic form (unless otherwise stated, the present specification always refers to the racemic mixture). However, in special cases, one of the optically active isomers can be utilized since the compounds can be divided into the two optically active isomers according to the process which comprises reacting a tetralone compound XXIX with acrylonitrile or methyl or ethyl acrylate, hydrolyzing the resulting compound of the formula:

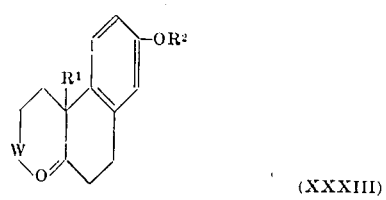

(XXXIII)

wherein R¹ and R² each has the same significance as designated above; W represents CN, COOCH₃ or COOC₂H₅, reacting the resulting compound of the formula:

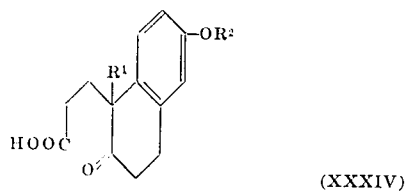

(XXXIV)

with an optically active amine, subjecting the corresponding salt to optical resolution on fractional recrystallization, treating the two optically active salts with a base or acid, and then subjecting each resulting optically active free acid to enol lactone formation and subjecting the resulting optically active compound of the formula:

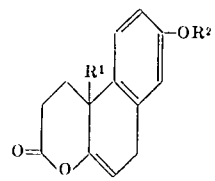

(XXXV)

To Grignard reaction with methylmagnesium halide, and finally subjecting the resulting diketone intermediate of the formula:

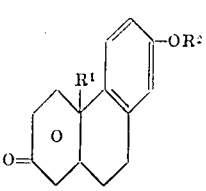

(XXXVI)

to dehydrative ring closure by the action of acid or base to yield optically active product VIII followed by the aforementioned mutual interconversions.

Condensation of a compound (XXIX) with acrylonitrile or acrylic acid ester is accomplished in the presence of a basic catalyst such as pyridine, triethylamine, Triton B (Benzyltrimethylammonium hydroxide), potassium hydroxide, sodium ethoxide, potassium t-butoxide, sodium amide, sodium hydride or the like.

In the second step, when W introduced in XXXIII in the preceding step is the nitrile group, it can readily be hydrolyzed with an acid or base to convert it to a carboxyl group. And, when the condensation of a starting compound with acrylic acid ester, in the preceding step, is carried out in the presence of a strong base, the ester group (W is COOCH₃ or COOC₂H₅) can be hydrolyzed by the addition of water after the reaction is completed, whereas when condensation is carried out in the presence of a weak base, the ester group should be hydrolyzed with an alkali hydroxide. In this step, the products need not be separated and purified particularly.

In the third step, the racemic carboxylic acid prepared in the preceding step is converted into the corresponding salts associated with an optically active amine. The optically active amines used as resolving agents in this step are exemplified by α-phenetylamine, 1-phenyl-2-methylaminopropane, 1-phenyl-2-aminopropane, 1p-nitrophenyl-2-aminopropane-1,3-diol, chloramphenicol, 2-amino-1-oxyhydrindene, methylamine, bornylamine, arginine, lysine, morphine, strychnine, quinidine, cinchonine, ephedrine, cinchonidine and the like. Fractional recrystallization of the resulting diastereomers affords the optically active carboxylic acid.

The procedure with cinchonidine as resolving agent is illustrated as follows. The salt formation can be accomplished by dissolving the starting compound (III) and equimolar amounts of cinchonidine in a suitable solvent such as acetone, methanol or the like under heating and then keeping at room temperature for a time. Removal of solvent and several fractional recrystallizations of the resulting cinchonidine salt (diastereomer) from ethyl acetate, acetone or the like afford an optical isomer (d-cinchonidine salt). This is treated with an acid or alkali to yield the free acid, i.e., d-carboxylic acid having the positive optical rotation. On the other hand, from the mother liquor after removal of d-cinchonidine salt, crude 1-cinchonidine is obtainable and treated immediately with an acid or alkali to yield 1-carboxylic acid having the negative optical rotation.

In the fourth step, the d- and 1-carboxylic acids are converted into the corresponding enol lactones (XXXV). The reaction is carried out in the presence of an acid anhydride and basic catalyst, for instance, in the presence of acetic anhydride and sodium acetate. The enol lactone prepared from dl-carboxylic acid in this step is non-crystalline oily material, but the d- and 1-enol lactones prepared from optically resolving carboxylic acids in the present invention each is crystalline material.

Among the crystalline optically active products, 1-isomers are useful as intermediates in the preparation of steroids and d-isomers are useful as intermediates in the preparation of the optically active phenanthrenes included in the formula VIII, which exhibit the same physiological activities twice as potent as the corresponding racemic VIII, according to the known method.

The compounds are useful for prophylaxis and therapy of acne, especially acne vulgaris of the sebaceous type, since they exhibit a controlling effect on excess secretion from the sebaceous glands. Accordingly, by the admixture of a small amount thereof in cosmetics, they act as a complexion conditioner and prevent make-up from streaking.

These compounds are amorphous (oily) or crystalline substances readily soluble in oils, paraffins are organic solvents and difficulty soluble in water and dilute aqueous organic solvents in general. Accordingly, in the application as external preparations, it is necessary to use, as the basal medium, oils, mineral oils, paraffins, organic solvents and surfactants to make solution, lotion, suspension, hydrophilic or lipophilic ointment (creams), cake, stick, cleaner, aerosol and the like in per se conventional manner. In the formulations, supplemental ingredients commonly used in basal medium of pharmaceutical preparations or cosmetics, for example solvents such as water, ethanol, isopropyl alcohol, propylene glycol, glycerol, ether, vegetable oils, essential oils, animal fats, beeswax, Vaseline, paraffins, silicone oils, polyethylene glycols, cetyl alcohol, stearyl alcohol, stearic acid, palmitic acid, sorbitol monostearate, isopropyl myristate, glycerol tristearate, diethylene glycol monostearate, anhydrous lanolin, lanolin, cholesterol or the like, surfactant dispersing agents and emulsifiers such as sodium arginate, gum arabic, tragacanth, methylcellulose, hydroxyethylcellulose, carboxymethylcellulose, (sodium salt), gelatine, glycerogelatine, pectin, triethanolamine oleate, triethanolamine stearate, sodium laurylsulfate, sodium dioctylsulfosuccinate, polyoxyethylene glycol alkyl ethers or esters, polyoxyethylene sorbitol monofatty acid esters, alkali soaps, calcium hydroxide, hydroxystearine sulfuric acid ester, sodium alkylbenzenesulfonates or the like, additives such as talc, starchs, magnesium stearate, aluminum stearate, zinc stearate, zinc flower, magnesium oxide, kaolin, bentonite, magnesium carbonate, precipitated calcium carbonate, silica, titanium oxide, Calamine, resins, waxes, milk, gummy substances, sodium sulfate, sodium carbonate, sodium bicarbonate, boric acid, aluminum sulfate, borax or the like, and other inorganic salts such as phosphates, silicates, or the like can be used in per se conventional manner.

The following examples are presented for the purpose of illustration, but they are not intended to limit the scope of the present invention.

EXAMPLE 1

A solution of 10 g. of 1,2,3,4-tetrahydro-1-ethyl-6-methoxynaphthalen-2-one and 3.3 g. of sodium hydride (54.5 percent) of 200 ml. of anhydrous benzene is refluxed for 30 minutes under nitrogen atmosphere. To the reaction mixture is added dropwise a solution of 6.55 g. of propargyl bromide in 100 ml. of benzene within a period of 40 minutes and the mixture is stirred for one hour at room temperature, refluxed for 2 hours, and then allowed to stand overnight at room temperature. The mixture is poured into ice-water and the product is extracted with ether, washed with water, dried over sodium sulfate and then evaporated in vacuo to yield 13.2 g. of oily residue. The residue is chromatographed on 60 g. of alumina and the fractional distillation of the elution with pentane-benzene (7 : 3 − 2 : 3) affords 9.4 g. of 1,2,3,4-tetrahydro-1-ethyl-propargyl-6-methoxynaphthalen-2-one having bp. 126°–136° C. (0.2 mmHg).

EXAMPLE 2

A mixture of 7.57 g. of 1,2,3,4-tetrahydro-1-ethyl-1-propargyl-6-methoxynaphthalen-2-one, prepared in Example 1, 11 ml. of water and 165 mg. of Hg-Dowex-50 in 75 ml of anhydrous methanol is heated at 40°–50° C. for 2 hours under vigorous stirring and nitrogen atmosphere. The reaction mixture is poured into ice-water and the product is extracted with ether, washed with water, dried over sodium sulfate and evaporated to yield 8.2 g. of oily residue. The residue is dissolved in 90 ml. of acetone and the solution added 30 mg. of Hg–Dowex–is heated at 40° – 50° C. for 10 minutes under nitrogen atmosphere and stirring. The reaction mixture is treated in the same manner as described above and the product is purified on fractional distillation in vaccuo to yield 6.13 g. of 1,2,3,4-tetrahydro-1-ethyl-1-acetonyl-6-methoxynaphthalen-2-one having bp. 138° – 150° C. (0.15 mmHg).

EXAMPLE 3

A solution of 1.22 g. of 1,2,3,4-tetrahydro-1-ethyl-1-acetonyl-6-methoxynaphthalen-2-one, prepared in Example 2, in 15 ml. of anhydrous methanol is added into a solution of 2.5 g. of powdered sodium methoxide in 15 ml. of anhydrous methanol under nitrogen atmosphere and stirring and then, after stirring for 30 minutes at room temperature, the reaction mixture is refluxed for 1.5 hours. After cooling, the mixture is poured into ice-water and the product is extracted with ether, washed with water, dried over sodium sulfate and evaporated to yield 1.2 g. of oily residue. The residue is chromatographed on 30 g. of alumina and the elution with pentane-benzene (4 : 1 – 1 : 4) on recrystallization from acetone-ether affords 876 mg. of 2,4,5,9b-tetrahydro-7-methoxy-9b-ethyl-1H-benz[e]inden-2-one having mp. 96°–97°C.

EXAMPLE 4

To a solution of 1.28 g. of 2,3,4,9,10,12-hexahydro-7-methoxy-12$\beta$-ethylphenanthren-2-one in 19 ml. of acetic acid is added 1.9 ml. of hydriodic acid, and the solution is refluxed for 0.5 hour. The reaction mixture is concentrated in vacuo and poured into cold water containing a small amount of sodium bisulfite and the product is extracted with ether. The ether extract is neutralized with sodium bicarbonate solution and then washed with 2N-sodium hydroxide solution to remove phenolic portion. The resulting aqueous solution is acidified with 2N-hydrochloric acid and the precipitate is extracted with ether, washed with saturated sodium chloride solution, dried over sodium sulfate and evaporated in vacuo to yield a reddish orange-colored oil, which on crystallization from methanolether affords 0.81 g. of 2,3,4,9,10,12-hexahydro-7-hydroxy-12$\beta$-ethylphenanthren-2-one having mp. 160°–171°C.

EXAMPLE 5

To a mixture of 1.8 g. of lithium and 300 ml. of liquid ammonia is added dropwise a solution of 5.68 g. of 2,3,4,9,10,12-hexahydro-7-methoxy-12$\beta$-butylphenanthren-2-one in 150 ml. of tetrahydrofuran within a period of 35 minutes with vigorous stirring. After stirring for an additional 30 minutes at low temperature, ammonium chloride is added to kill excess of lithium and the reaction mixture is allowed to stand at room temperature to evaporate ammonia. Water is added and the product is extracted with ether, washed with water, dried over sodium sulfate and evaporated to yield 4.13 g. of dihydro derivative, i.e., 1,2,3,4,9,10,12-octahydro-7-methoxy-12$\beta$-butylphenanthren-2-one.

EXAMPLE 6

A solution of 2.62 g. of dihydro derivative, prepared in Example 5, in 80 ml. of tetrahydrofuran is added dropwise into a mixture of 0.83 g. of lithium aluminum hydride and 110 ml. of anhydrous tetrahydrofuran within a period of 20 minutes with stirring. Thereafter, the reaction mixture is stirring at room temperature for one hour and then refluxed for one hour. After cooling, the reaction mixture is poured into ice-water, and acidified with diluted hydrochloric acid and the product is extracted with ether, washed with water, dried over sodium sulfate and evaporated to yield 2.78 g. of 1,2,3,4,9,10,11$\alpha$,12-octahydro-7-methoxy-12$\beta$-butylphenanthren-2$\beta$-ol.

EXAMPLE 7

A solution of 2.78 g. of 1,2,3,4,9,10,11$\alpha$,12-octahydro-7-methoxy-12$\beta$-butylphenanthren-2$\beta$-ol, prepared in Example 6, and 2.03 g. of benzoyl chloride in 15 ml. of anhydrous pyridine is allowed to stand overnight at room temperature. Into the reaction mixture several pieces of ice is added and the mixture is let stand as it is for 30 minutes. Water is added and the product is extracted with dichloromethane, washed with 2N-hydrochloric acid, 2N-sodium carbonate, and then water, dried over sodium sulfate and evaporated in vacuo to yield 3.23 g. of oily residue, which on crystallization affords 1.69 g. of 1,2,3,4,9,10,11$\alpha$,12-octahydro-2$\beta$-benzoyloxy-7-methoxy-12$\beta$-butylphenanthrene as needles having mp. 141°–143°C.

EXAMPLE 8

To a mixture of 7 g. of lithium and 500 ml. of liquid ammonia is added a solution of 3 g. of 2,3,4,9,10,12-hexahydro-7-methoxy-12$\beta$-ethylphenanthren-2-one in 20 ml. of dry methanol with vigorous stirring, and then added 80 ml. of dry ether within a period of 40 minutes. After stirring for an additional 20 minutes, the reaction mixture is added dropwise dry ethanol under cooling with dry ice-acetone until the blue color disappears, and then allowed to stand overnight to evaporate ammonia. Water is added and the product is extracted with ether, washed with sodium chloride solution, dried over sodium sulfate and evaporated to yield 2.5 g. of oily residue, which on crystallization from ether-pentane affords 1.144 g. of 1,2,3,4,5,8,9,10,11$\alpha$,12-decahydro-7-methoxy-12$\beta$-ethylphenanthren-2$\beta$-ol (37.3 percent yield) having mp. 116°–130°C. A pure specimen for analysis, recrystallized from acetone, has mp. 135°–137°C.

EXAMPLE 9

To a mixture of 6.2 g. of lithium and 300 ml. of liquid ammonia is added a solution of 2.84 g. of 2,3,4,9,10,12-hexahydro-7-methoxy-12$\beta$-butylphenanthren-2-one in a mixture of 94 ml. of dry ether, 16.5 ml. of dry dioxane and 23 ml. of dry ethanol with vigorous stirring within a period of 30 minutes. After stirring for an additional 20 minutes, the reaction mixture is added dropwise 60 ml. of ethanol to kill an excess of lithium, and ammonia is evaporated at room temperature. Treatment according to the same procedure as Example 8 affords 2.78 g. of 1,2,3,4,5,8,9,10,11$\alpha$12-decahydro-7-methoxy-12$\beta$-butylphenanthren-2$\beta$-ol.

IR: $\nu_{max}^{CCl_4}$ 3520, 3280 (broad), 1695, 1660 (shoulder), 1228, 1038 cm$^{-1}$.

EXAMPLE 10

According to the same procedure as Example 8, 1,2,3,4,9,10,11$\alpha$,12-octahydro-7-methoxy-12$\beta$-ethylphenanthren-2-one is converted into 1,2,3,4,5,8,9,10,11$\alpha$12-decahydro-7-methoxy-12$\beta$-ethylphenanthren-2$\beta$-ol.

EXAMPLE 11

According to the same procedure of Example 9, 1,2,3,4,9,10,11$\alpha$,12-octahydro-7-methoxy-12$\beta$-ethylphenanthren-2$\beta$-ol is converted into 1,2,3,4,5,8,9,10,11α12-decahydro-7-methoxy-12β-butylphenanthren-2β-ol.

EXAMPLE 12

While purified gaseous acetylene is bubbled into 60 ml. of anhydrous ether under stirring, a solution of 1.35 g. of potassium in 20 ml. of anhydrous t-amyl alcohol and a solution of 1.35 g. of 1,2,3,4,9,10,11α,12-octahydro-7-methoxy-12β-ethylphenanthren-2-one in 60 ml. of anhydrous ether and 6 ml. of anhydrous benzene is added dropwise into the solution within a period of 1.5 hour at room temperature. Thereafter, as continuously bubbling acetylene, the reaction mixture is stirred for 5 hours at room temperature and then saturated ammonium chloride solution containing a small amount of hydrochloric acid is added in order to acidify the mixture (pH 2). The product is extracted with ether, washed with water, dried over sodium sulfate and then evaporated to yield a reddish-brown oily material which on chromatography using 15 g. of neutral alumina affords 1.23 g. of yellow oily material. The material is crystallized from water-methanol to yield 899 mg. of 1,2,3,4,9,10,11α,12-octahydro-2-ethynyl-7-methoxy-12β-ethylphenanthren-2-ol having M.P. 47°–49° C. (61 percent yield).

EXAMPLE 13

According to the same procedure as in Example 12, 1,2,3,4,9,10,11α,12-octahydro-7-methoxy-12β-methylphenanthren-2-one is converted into 999 mg. of 1,2,3,4,9,10,11α,12e-octahydro-2-ethynyl-7-methoxy-12β-methylphenanthren-2-ol having M.P. 152° – 155° C. (76percent yield).

Example 14

A solution of 565 mg. of 1,2,3,4,9,10,11α,12-octahydro-7-methoxy-12β-butylphenanthren-2-one in a mixture of 11 ml. of methanol and 1.1 ml. of acetic acid is refluxed with 630 mg. of isonicotinic acid hydrazide for 1.5 hours. After cooling, the reaction mixture is neutralized with methanolic potassium hydroxide solution and evaporated under reduced pressure. Water is added and the product is extracted with dichloromethane, washed with water, dried over sodium sulfate and evaporated to yield 750 mg. of crude crystal which on recrystallization from dichloromethane-ether affords 580 mg. of 1,2,3,4,9,10,11α,12e-octahydro-7-methoxy-12β-butylphenanthren-2-one isonicotinoylhydrazone having M.P. 105°–110° C.

EXAMPLE 15

A solution of 5 g. of 3,4,9,10-tetrahydro-2-pyrrolidino-7-methoxyphenanthrene and 3 g. of allyl bromide in 100 ml. of acetonitrile is refluxed for 15 hours under nitrogen atmosphere, and after adding 15 ml. of water, the reaction mixture is refluxed for an additional 20 minutes. Solvent is evaporated in vacuo and ice-water is added. The product is extracted with ether, washed with 2N-hydrochloric acid, 2N-sodium carbonate and then water, dried over sodium sulfate and evaporated to give 1,2,3,4,9,10-hexahydro-1-allyl-7-methoxyphenanthren-2-one having bp. 190° – 195° C. (1.0 – 1.2 mmHg).

UV: $\lambda_{max}^{95\%EtOH}$ 275 mμ (ε 12,320). IR:

$\nu_{max}^{CCl_4}$ 1675, 1640, 1610, 1523, 1502, 1253, 1502, 1253, 1044, 915 cm⁻¹. Anal. Calcd. for $C_{18}H_{20}O_2$: C, 80.56; H, 7.51. Found: C, 80.64; H, 7.61.

EXAMPLE 16

A solution of 3,4,9,12-tetrahydro-2-pyrrolidino-7-methoxy-12β-ethylphenanthrene, prepared from 0.85 g. of 2,3,4,9,10,12-hexahydro-7-methoxy-12β-ethylphenanthren-2-one and 2 ml. of pyrrolidine, in 10 ml. of dioxane is refluxed for 23.5 hours with 1 ml. of methyl iodide, and after adding 5 ml. of water and 0.2 ml of acetic acid, the reaction mixture is refluxed for an additional 3 hours. Solvent is evaporated in vacuo and the after-treatment according to the procedure for Example 15 affords 0.80 g. of oily material, which is chromatographed on 15 g. of alumina. Elution with pentane-benzene (9 : 1 to 4 : 1) affords 540 mg. of oily residue and the residue, moreover, chromatographed on 15 g. of silica gel with pentane-benzene (3 : 7 to 1 : 9). Elution with the same solvent mixture affords 200 mg. of 2,3,4,9,10,12-hexahydro-1-methyl-7-methoxy-12β-ethylphenanthren-2-one having bp. 180° C. (bath temperature; 0.3 mmHg).

UV: $\lambda_{max}^{95\%EtOH}$ 250.5 mμ (ε 15,640).

IR: $\nu_{max}^{CHCl_3}$ 1660, 1614, 1582, 1500, 1265, 1036 cm⁻¹. Anal. Calcd. for $C_{18}H_{22}O_2$: C, 79.96; H, 8.20. Found: C, 79.80; H, 8.30.

EXAMPLE 17

According to the same procedure as Example 15, 3,4,9,12-tetrahydro-2-pyrrolidino-12β-ethylphenanthrene is converted into 2,3,4,9,10,12-hexahydro-1-allyl-7-methoxy-12β-ethylphenanthren-2-one having bp 140°– 150° C. (bath temperature; 0.08 – 0.1 mmHg).

IR: $\nu_{max}^{CCl_4}$ 1667, 1610, 1500 cm⁻¹. Anal. Calcd. for $C_{20}H_{24}O_2$: C, 81.04; H, 8.16. Found: C, 81.17; H, 8.13.

EXAMPLE 18

Precise fractional distillation of 19.20 g. of 2,3,4,9,10,12-hexahydro-7-methoxy-12β-allylphenanthren-2-one at reduced pressure (bath temperature 200° – 260° C. affords 1,2,3,4,9,10-hexahydro-7-methoxy-1-allylphenanthren-2-one having bp. 190°– 195° C. (1.0 – 1.2 mmHg).

UV: $\lambda_{max}^{95\%EtOH}$

257 μ (ε 12,320).

IR: $\nu_{max}^{CCl_4}$ 1721, 1675, 1640, 1610, 1523, 1502, 1253, 1044, 915 cm$^{-1}$. Anal. Calcd. for $C_{18}H_{20}O_2$: C, 80.56; H, 7.51. Found: C, 80.64; H, 7.61.

EXAMPLE 19

To a solution of 16.2 g. of acrylonitrile in 1 L. of dioxane is added 51 g. of dl-1-ethyl-6-methoxy-1,2,3,4-tetrahydronaphthanen-2-one and 20 percent benzyltrimethylammonium hydroxide solution (triton B) at 5° – 10° C. and the solution is stirred for 24 hours under nitrogen atmosphere. Dioxane is evaporated in vacuo and the residue dissolved in dichloromethane is washed with water and satureated sodium chloride solution, dried over sodium sulfate and evaporated to yield a reddish-orange oil, which on fractional distillation affords 51.4 g. of dl-1-ethyl-2-oxo-6-methoxy-1,2,3,4-tetrahydronaphthalen-1-propionitrile having bp. 170° – 174° C. (0.1 – 0.2 mmHg) (79.9 percent yield). $n_D^{24}$ 1.5464.

IR: $\nu_{max}^{CCl_4}$ 2227, 1714, 1613, 1578, 1503, 1266, 1043 cm$^{-1}$. Anal. Calcd. for $C_{16}H_{19}O_2N$ : C, 74.68; H, 7.44; N, 5.44. Found: C, 74.81; H, 7.66; N, 5.26.

EXAMPLE 20

To a solution of 30.5 g. of dl-1-ethyl-2-oxo-methoxy-1,2,3,4-tetrahydronaphthalen-1-propionitrile in 250 ml. of ethanol is added 250 ml. of 20 percent potassium hydroxide solution and the solution is refluxed for 6 hours under nitrogen atmosphere. In the midst of the reaction, evolution of ammonia gas is recognized. The reaction mixture is evaporated in vacuo and diluted with water and the resulting alkaline solution is washed with dichloromethane, and then acidified with concentrated hydrochloric acid. The product is extracted with ether, washed with saturated sodium chloride solution, dried over sodium sulfate and evaporated in vacuo to yield 31.6 g. of dl-1-ethyl-2-oxo-6-methoxy-1,2,3,4-tetrahydronaphthalen-1-propionic acid as crude keto acid. IR:

$\nu_{max}^{CCl_4}$

3200 – 2500 (broad), 1710, 1610, 1575, 1501, 1265, 1045 cm$^{-1}$.

EXAMPLE 21

A solution prepared by dissolving 10.5 g. of dl-1-ethyl-2-oxo-6-methoxy-1,2,3,4-tetrahydronaphthalen-1-propionic acid (0.038 mole) and 11.2 g. of cinchonidine (mp. 201° – 203° C.; $[\alpha]_D^{24}$ –91.5° (chloroform))(0.038 mole) under heating is kept at room temperature for 30 minutes. Solvent is evaporated in vacuo and the resulting residue dissolved in hot ethyl acetate is allowed to stand for a time at room temperature or low temperature (in ice-box) to yield 16.87 g. of cinchonidine salt as crude material having mp. 137° – 141° C. $[\alpha]_D^{24}$ –62.3±0.9° ($c$ = 1.06; chloroform). Several fractional crystallization of the crude cinchonidine salt from ethyl acetate afford 6.6 g. of d-1-ethyl-2-oxo-6-methoxy-1,2,3,4-tetrahydronaphthalen-1-propionic acid cinchonidine salt having mp. 137° – 141° C. $[\alpha]_c^{24}$ –56.6±0.8° ($c$ = 1.07; chloroform). The d-cinchonidine salt (6.56 g.) is treated with cooled 2N-potassium carbonate solution and the resulting precipitate is removed by extracting with dichloromethane. The aqueous solution is acidified with concentrated hydrochloric acid and the precipitate is extracted with ether, washed with saturated sodium chloride solution, dried over sodium sulfate and evaporated in vacuo to yield 3.14 g. of oily free acid, i.e., d-1-ethyl-2-oxo-6-methoxy-1,2,3,4-tetrahydronaphthalen-1-propionic acid, having $[\alpha]_D^{24}$ +8.3±0.3° ($c$ = 0.97; chloroform).

On the other hand, the concentration in vacuo of the combined mother liquids resulting from the preparation of cinchonidine salt and from fractional recrystallization thereof afford 13.7 g. of oily residue rich in d-1-ethyl-2-oxo-6-methoxy-1,2,3,4-tetrahydronaphthalen-1-propionic acid cinchonidine salt. Treatment of this residue with 2N-potassium carbonate solution according to the same procedure as in the preparation of d-free acid affords 6.1 g. of l-free acid, i.e., 1-1-ethyl-2-oxo-6-methoxy-1,2,3,4-tetrahydronaphthalen-1-propionic acid, as crude oily material. $[\alpha]_D^{24}$ –5.3±0.3° ($c$ = 1.4; chloroform).

EXAMPLE 22

A solution of 3.13 g. of d-1-ethyl-2-oxo-6-methoxy-1,2,3,4-tetrahydronaphthalen-1-propionic acid prepared in Example 21 in 45 ml. of acetic anhydride is refluxed with 1.5 g. of anhydrous sodium acetate for 4 hours under nitrogen atmosphere. Acetic anhydride is removed off in vacuo and the residue is extracted with dichlromethane, washed with saturated sodium bicarbonate solution and with saturated sodium chloride solution, dried over sodium sulfate and evaporated to yield crude crystals, which on recrystallization from dichloromethane-ether afford 2.4 g. of d-enol lactone, i.e., d-4a-ethyl-7-methoxy-3,4,4a,9-tetrahydro-2H-1-oxaphenanthren-2-one, having mp. 132° – 133.5° C. $[\alpha]_D^{24}$ =22.2 ±0.5° ($c$ = 0.94; chloroform).

EXAMPLE 23

Treatment of 1.37 g. of 1-1-ethyl-2-oxo-6-methoxy-1,2,3,4-tetrahydronaphthalen-1-propionic acid prepared in Example 21 according to the manner described in Example 22 and recrystallization of the resulting product from dichloromethane-ether yields 0.79 g. of l-enol lactone, i.e., 1-4a-ethyl-7-methoxy-3,4,4a,9-tetrahydro-2H-1-oxaphenanthren-2-one, having M.P. 131° – 132° C. $[\alpha]_D^{23}$ –22.2 ± 0.5° ($c$ = 1.11; chloroform).

EXAMPLE 24

| | |
|---|---|
| Stearic acid | 6 g, |
| Propylene glycol monostearate | 12 g and |
| Isopropyl myristate | 8 g | are melted and homogenized together. In the resultant mixture,

| | |
|---|---|
| Methyl p-hydroxybenzoate | 0.02 g and |
| Butyl p-hydroxybenzoate | 0.18 g | are dissolved. To the mixture there is added a mixture of

| | |
|---|---|
| 4a-Ethyl-7-methoxy-2,3,4,4a$\beta$,9,10-hexahydrophenanthren-2-one | 2.5 g, |
| Propylene glycol | 3.0 g and |
| Polyoxyethylene sorbitan monopalmitate | 6.0 g | and the resultant mixture is then stirred with addition of warm water to emulsify and prepare 100 g of the product.

In the present prescription, replacement of the principal active ingredient by the corresponding amount (one-half amount of dl-series) of optically active substance (d-series) gives a product having the same activity. Controlling the amount of the active ingredient added gives ointments of various concentrations up to 10.0 percent.

Replacing the active ingredient by various compounds mentioned above, especially by 7-Methoxy-2,3,4,4aβ,9,10-hexahydrophenanthren-2-one, 4a-Methyl-7-methoxy-2,3,4,4aβ,9,10-hexahydrophenanthren-2-one, 4a-Ethyl-7-hydroxy-2,3,4,4aβ,9,10-hexahydrophenanthren-2-one, 4a-Propyl-7-methoxy-2,3,4,4aβ,9,10-hexahydrophenanthren-2-one, 4a-Allyl-7-methoxy-2,3,4,4aβ,9,10-hexahydrophenanthren-2-one, 4a-Butyl-7-methoxy-2,3,4,4aβ,9,10-hexahydrophenanthren-2-one, 4a-Methyl-7-methoxy-1,2,3,4,4aβ,9,10,10aα-octahydrophenanthren-2-one, 4a-Ethyl-7-methoxy-1,2,3,4,4aβ,9,10,10aα-octahydrophenanthren-2-one, 4a-Butyl-7-methoxy-1,2,3,4,4aβ,9,10,10aα-octahydrophenanthren-2-one, 7-Methoxy-1,2,3,4,9,10-hexahydrophenanthren-2-one, 1β-Allyl-7-methoxy-1,2,3,4,9,10-hexahydrophenanthren-2-one, 1,2,3,4,4aβ,4bα,5,6,7,9,10,10aα-Dodecahydrophenanthrene-2,7-dione or 7-Methoxy-9b-ethyl-2,4,5,9bβ-tetrahydro-1H-benz[e]inden-2-one, or oxime, semicarbazone, hydrazone, phenylhydrazone, ketal, enol acetate, enol ether or the like thereof, or optically active substance thereof, or more than one specimen thereof gives a product of the same activity.

Addition of suitable amount (about 0.1 g or less) of sodium ethylenediaminetetraacetate to the above ointment in the emulsifying step gives a more stable product.

EXAMPLE 25

| | |
|---|---|
| 4a-Ethyl-7-methoxy-2,3,4,4aβ,9,10-hexahydrophenanthren-2-one | 3.0 g | is dissolved in

| | |
|---|---|
| Isopropyl alcohol | 75 g. |

To the mixture there are added

| | |
|---|---|
| Propylene glycol | 81 g, |
| Diethyl sebacate | 9 g and |
| Pluronic L-64 (polypropylene glycol-ethylene oxide condensate: HO(C₂H₄O)ₐ(C₃H₆O)ᵦ (C₂H₄O)ᵧH) | 3 g | and then a solution of

| | |
|---|---|
| Boric acid | 3.0 g and |
| Sodium ethylenediaminetetraacetate | 0.3 g | in an appropriate amount of water. The mixture is further stirred with addition of water to prepare 300 g of product.

Varying the amount of active ingredient in the present prescription gives lotions of various concentrations up to 5.0 percent. Replacing the active ingredient with various compounds, as in Example 24, gives similar products.

EXAMPLE 26

| | |
|---|---|
| 4a-Ethyl-7-methoxy-2,3,4,4aβ,9,10-hexahydrophenanthren-2-one | 1.0 g, |
| Boric acid | 0.5 g, |
| Isopropyl alcohol | 25 g, |
| Diethyl sebacate | 3 g, |
| Pluronic L-64 | 1.0 g and |
| Propylene glycol | 28 g | are mixed with stirring to dissolve. To the resultant solution there is added

Carbopol No. 940 (acid form carboxyvinyl polymer: $(CH_2\ \ CH-COOH)_x$) 1.0 g and the mixture is homogenized. An aqueous solution containing

| | |
|---|---|
| Borax | 0.4 g and |
| Sodium ethylenediaminetetraacetate | 0.01 g | is added to the resultant mixture with stirring, and 100 g of a gel product is prepared by the addition of water.

Varying the amount added and the specific principal active ingredient in the present prescription as in Examples 24 and 25 gives products of the same activity having varying concentrations.

EXAMPLE 27

| | |
|---|---|
| Stearic acid sodium potassium salt | 68 g, |
| Sodium laurylsulfate | 29 g, |
| Pluronic L-64 | 2 g, |
| Lanolin | 1 g, |
| 4a-Ethyl-7-methoxy-1,2,3,4,4aβ,9,10,10aα-octahydrophenanthren-2β-ol | 0.1 g and | appropriate amount of perfumes and coloring agents are mixed and kneaded to prepare a soap preparation.

Varying the amount added to the active ingredient in the present prescription gives a series of soaps having various concentrations up to 2.0 percent. Stabilizers such as sodium ethylenediaminetetraacetate, sorbic acid and the like, aminobenzoic acid ethyl ester, and bactericidal or antiseptic agents such as ethyl p-hydroxybenzoate, G-11 (hexachlorophene), sulfa-drugs and the like can be added.

The active ingredient can be replaced by others mentioned in Example 24 or by

4a-Methyl-7-methoxy-2,3,4,4aβ,9,10-hexahydrophenanthren-2β-ol,

2-Ethynyl-4a-methyl-7-methoxy-1,2,3,4,4aβ,9,10,10aα-octahydrophenanthren-2-ol,

2-Ethynyl-4a-ethyl-7-methoxy-1,2,3,4,4aβ,9,10,10aα-octahydrophenanthren-2-ol,

7-Methoxy-1,2,3,4,4aβ,9,10,10aα-octahydrophenanthren-2β-ol,

4a-Methyl-7-methoxy-1,2,3,4,4aβ,9,10,10aα-octahydrophenanthren-2β-ol,

4a-Ethyl-7-methoxy-1,2,3,4,4aβ,9,10,10aα-octahydrophenanthren-2β-ol,

4a-Butyl-7-methoxy-1,2,3,4,4aβ,9,10,10aα-octahydrophenanthren-2β-ol,

7-Methoxy-1,2,3,4,9,10-hexahydrophenanthren-2β-ol,

7-Methoxy-1,2,3,4,4aβ,5,8,9,10,10aα-decahydrophenanthren-2β-ol,

4a-Methyl-7methoxy-1,2,3,4,4aβ,5,8,9,10,10aα-
decahydrophenanthren-2β-ol,

4a-Ethyl-7-methoxy-1,2,3,4,4aβ,5,8,9,10,10aα-
decahydrophenanthren-2β-ol,

2β-Hydroxy-1,2,3,4,4aβ,4bα,5,6,7,9,10,10aα-
dodecahydrophenanthren-7-one,

2β-Hydroxy-4α-methyl-1,2,3,4,4aβ,5,6,7,9,10,10aα-
dodecahydrophenanthren-7-one, 2β-Hydroxy-4a-ethyl-1,2,3,4,4aβ,4bα,5,6,7,9,10,10
aα-dodecahydrophenanthren-7-one or the like, or optically active substance thereof, or more than one thereof to give a product of the same activity.

EXAMPLE 30

| Stearic acid | 15 g, |
| Glycerol monostearate | 1 g and |
| Anhydrous lanolin | 1 g | are melted and homogenized. In the mixture there is dissolved

| 4a-Ethyl-7-methoxy-1,2,3,4,4aβ,9,10,10aα-octahydrophenanthren-2-one | 0.1 g. |

Further to the resultant solution, there are added an aqueous solution of

| Diisopropylamine | 2 g, |
| Glycerol | 10 g and |
| Borax | 4 g | with vigorous stirring to emulsify. Amount of the product is adjusted to 100 g by the addition of water and appropriate amount of perfume and coloring matter are added with stirring until the composition becomes cold.

In the present prescription, toilet creams of various concentrations up to 1.0 percent can be prepared by controlling the amount added of the active ingredient. Products of good preservation capacity can also be prepared by the addition of supplemental ingredients such as sodium ethylenediaminetetraacetate, vitamin C dibenzoate, ethyl aminobenzoate and the like in the stirring process.

The various compositions thus described which are adapted to topical application are applied to affected skin (e.g., face of patient suffering from acne) in amounts sufficient to cover the affected parts —application being repeated as often as required to keep the disaffection under control or in accordance with doctor's direction.

In the foregoing Examples "g" stands for grams(s), "mg" stands for milligram(s) and "ml" stands for milliliter(s). Percentages are by weight.

What we claim is:

1. An externally applicable therapeutic composition which comprises an externally applicable pharmaceutically acceptable carrier and a therapeutically effective amount for the treatment of acne of a compound having the formula

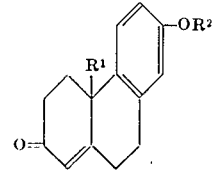

wherein $R^1$ represents an alkyl having one to four carbon atoms and $R^2$ is selected from the group consisting of hydrogen and methyl.

2. A composition claimed in claim 1, wherein the compound is dl- or d-4a-methyl-7-hydroxy-2,3,4,4 aβ,9,10-hexahydrophenanthren-2-one.

3. A composition claimed in claim 1, wherein the compound is dl- or d-4a-methyl-7-methoxy-2,3,4,4 aβ,9,10-hexahydrophenanthren-2-one.

4. A composition claimed in claim 1, wherein the compound is dl- or d-4a-ethyl-7-hydroxy-2,3,4,4 aβ,9,10-hexahydrophenanthren-2-one.

5. A composition claimed in claim 1, wherein the compound is dl- or d-4a-ethyl-7-methoxy-2,3,4,4 aβ,9,10-hexahydrophenanthren-2-one.

6. A composition claimed in claim 1, wherein the compound is dl- or d-4a-propyl-7-hydroxy-2,3,4,4 aβ,9,10-hexahydrophenanthren-2-one.

7. A composition claimed in claim 1, wherein the compound is dl- or d-4a-propyl-7-methoxy-2,3,4,4 aβ,9,10-hexahydrophenanthren-2-one.

8. A composition claimed in claim 1, wherein the compound is dl- or d-4a-isopropyl-7-hydroxy-2,3,4,4 aβ,9,10-hexahydrophenanthren-2-one.

9. A composition claimed in claim 1, wherein the compound is dl- or d-4a-isopropyl-7-methoxy-2,3,4,4 aβ,9,10-hexahydrophenanthren-2-one.

10. A composition claimed in claim 1, wherein the compound is dl- or d-4a-butyl-7-hydroxy-2,3,4,4 aβ,9,10-hexahydrophenanthren-2-one.

11. A composition claimed in claim 1, wherein the compound is dl- or d-4a-butyl-7-methoxy-2,3,4,4 aβ,9,10-hexahydrophenanthren-2-one.

12. A composition claimed in claim 1, wherein the compound is dl- or d-4a-s-butyl-7-hydroxy-2,3,4,4 aβ,9,10-hexahydrophenanthren-2-one.

13. A composition claimed in claim 1, wherein the compound is dl- or d-4a-s-butyl-7-methoxy-2,3,4,4 aβ,9,10-hexahydrophenanthren-2-one.

14. A composition claimed in claim 1, wherein the compound is dl- or d-4a-t-butyl-7-hydroxy-2,3,4,4 aβ,9,10-hexahydrophenanthren-2-one.

* * * * *